US010703495B2

(12) United States Patent
Bahena et al.

(10) Patent No.: US 10,703,495 B2
(45) Date of Patent: Jul. 7, 2020

(54) SECONDARY RELEASE ARRANGEMENT FOR EVACUATION SLIDE SYSTEMS

(71) Applicant: Goodrich Corporation, Charlotte, NC (US)

(72) Inventors: Daniel Bahena, Phoenix, AZ (US); Timothy C Haynes, Prescott Valley, AZ (US)

(73) Assignee: Goodrich Corporation, Charlotte, NC (US)

( * ) Notice: Subject to any disclaimer, the term of this patent is extended or adjusted under 35 U.S.C. 154(b) by 645 days.

(21) Appl. No.: 15/405,835

(22) Filed: Jan. 13, 2017

(65) Prior Publication Data
US 2018/0201379 A1   Jul. 19, 2018

(51) Int. Cl.
  *B64D 25/14*  (2006.01)
  *F16G 11/00*  (2006.01)
  *F16B 19/00*  (2006.01)
  *A62B 1/20*  (2006.01)

(52) U.S. Cl.
  CPC ............... *B64D 25/14* (2013.01); *A62B 1/20* (2013.01); *F16B 19/00* (2013.01); *F16G 11/00* (2013.01)

(58) Field of Classification Search
  CPC ........ B64D 25/14; B64D 25/00; B64D 25/08; B63B 2027/145; B61B 12/00
  See application file for complete search history.

(56) References Cited

U.S. PATENT DOCUMENTS

| 3,391,771 | A |   | 7/1968 | Day |
|---|---|---|---|---|
| 3,554,344 | A | * | 1/1971 | Summer ................ B64D 25/14 193/25 B |
| 3,606,939 | A |   | 9/1971 | Summer |
| 3,669,217 | A |   | 6/1972 | Fisher |
| 3,793,498 | A |   | 2/1974 | Matsui |
| 3,897,861 | A |   | 8/1975 | Miller et al. |
| 3,944,023 | A | * | 3/1976 | Fisher ...................... A62B 1/20 182/48 |
| 4,089,545 | A |   | 5/1978 | Ferry |
| 4,460,062 | A | * | 7/1984 | Fisher .................... B64D 25/14 182/48 |

(Continued)

FOREIGN PATENT DOCUMENTS

| EP | 0110206 A1 | 6/1984 |
|---|---|---|
| EP | 0163925 | 12/1985 |

(Continued)

OTHER PUBLICATIONS

USPTO, Non Final Office Action dated Apr. 12, 2019 in U.S. Appl. No. 15/407,818.

(Continued)

*Primary Examiner* — Benjamin P Lee
(74) *Attorney, Agent, or Firm* — Snell & Wilmer, L.L.P.

(57) ABSTRACT

A secondary release arrangement for a releasable restraint may comprise a flexible member in operable communication with a strap attached to the releasable restraint configured to release the strap from the releasable restraint in response to a tensile force in the flexible member exceeding a selected threshold. In various embodiments, the secondary release arrangement may be configured to allow deployment of an evacuation system in the event of the releasable restraint failing to release.

20 Claims, 4 Drawing Sheets

(56) References Cited

U.S. PATENT DOCUMENTS

| | | | |
|---|---|---|---|
| 4,526,262 A * | 7/1985 | Malcolm | B64D 25/14 |
| | | | 182/48 |
| 4,567,977 A * | 2/1986 | Fisher | A62B 1/20 |
| | | | 182/48 |
| 4,850,295 A | 7/1989 | Weaver | |
| 5,195,217 A | 3/1993 | Arntzen | |
| 5,398,383 A * | 3/1995 | Bingold | E05B 75/00 |
| | | | 24/16 PB |
| 5,466,082 A * | 11/1995 | Sherar | B66C 15/00 |
| | | | 403/157 |
| 5,711,495 A | 1/1998 | Danielson | |
| 5,871,180 A * | 2/1999 | Hublikar | B64D 25/14 |
| | | | 193/25 B |
| 6,196,033 B1 * | 3/2001 | Dowdle | E05B 75/00 |
| | | | 24/16 PB |
| 6,814,183 B2 | 11/2004 | Horvath | |
| 8,066,108 B2 | 11/2011 | Hentges | |
| 9,296,484 B2 | 3/2016 | Biro | |
| D753,885 S * | 4/2016 | Hill | D29/120.2 |
| 10,189,573 B2 * | 1/2019 | Haynes | B64D 25/14 |
| 2002/0175024 A1 * | 11/2002 | Kurtgis | A62B 35/0075 |
| | | | 182/3 |
| 2004/0094361 A1 | 5/2004 | Gronlund et al. | |
| 2012/0090521 A1 | 4/2012 | Zablocki | |
| 2013/0200217 A1 | 8/2013 | Biro | |
| 2013/0256159 A1 | 10/2013 | Walsh | |
| 2014/0224937 A1 | 8/2014 | Brown | |
| 2015/0097083 A1 | 4/2015 | Rellmann | |
| 2016/0107755 A1 | 4/2016 | Bessettes et al. | |
| 2016/0367845 A1 | 12/2016 | Bouquier | |
| 2018/0170559 A1 * | 6/2018 | Haynes | B64D 25/18 |
| 2018/0201379 A1 * | 7/2018 | Bahena | B64D 25/14 |
| 2018/0201381 A1 * | 7/2018 | Volny | B64D 25/14 |
| 2018/0273189 A1 * | 9/2018 | Haynes | B63C 9/22 |
| 2018/0273192 A1 * | 9/2018 | Haynes | F16B 19/02 |
| 2018/0312265 A1 * | 11/2018 | Haynes | B64D 25/14 |
| 2018/0334256 A1 * | 11/2018 | Haynes | B64D 25/14 |

FOREIGN PATENT DOCUMENTS

| | | | |
|---|---|---|---|
| EP | 0260354 | 3/1988 | |
| EP | 3348482 A1 * | 7/2018 | B64D 25/14 |

OTHER PUBLICATIONS

USPTO, Restriction/Election Requirement dated Jan. 30, 2019 in U.S. Appl. No. 15/407,818.
European Patent Office, European Search Report dated Mar. 2, 2018 in European Application 18150481.2.
European Patent Office, European Search Report dated Mar. 27, 2018 in Application No. 18150827.6-1010.
USPTO, Pre-Interview First Office Action dated Apr. 3, 2018 in U.S. Appl. No. 15/407,852.
USPTO, First Action Interview Office Action dated Jul. 10, 2018 in U.S. Appl. No. 15/407,852.
Haynes et al., U.S. Appl. No. 15/405,854, filed Jan. 13, 2017 entitled "Light Weight Restraint for Evacuation Slide Systems".
Volny et al., U.S. Appl. No. 15/407,852, filed Jan. 17, 2017 entitled "Continuously Restrained Evacuation System".
Volny et al., U.S. Appl. No. 15/407,818, filed Jan. 17, 2017 entitled "Shock Absorbing Evacuation System Restraint".
Extended European Search Report dated Feb. 7, 2018 in European Application No. 18150447.3.
Extended European Search Report dated Feb. 22, 2018 in European Application No. 18151883.8.
USPTO, Pre-Interview First Office Action dated Jun. 19, 2019 in U.S. Appl. No. 15/405,854.
European Patent Office, European Office Action dated May 16, 2019 in Application No. 18151883.8.
European Patent Office, European Office Action dated Apr. 3, 2019 in Application No. 18150827.6.
USPTO, Final Office Action dated Apr. 22, 2018 in U.S. Appl. No. 15/407,852.
European Office Action dated May 7, 2019 in European Application No. 18150447.3.
USPTO, Notice of Allowance dated Jun. 4, 2019 in U.S. Appl. No. 15/407,852.
USPTO, Notice of Allowance dated Aug. 1, 2019 in U.S. Appl. No. 15/407,818.
USPTO, Notice of Allowance, dated Sep. 20, 2019 in U.S. Appl. No. 15/407,818.
Jaro S. Volny, et al, U.S. Appl. No. 16/657,951, filed Oct. 18, 2019 and entitled "Shock Absorbing Evacuation Systems and Methods".
USPTO, Notice of Allowance dated Oct. 21, 2019 in U.S. Appl. No. 15/405,854.
European Patent Office, European Office Action dated Dec. 9, 2019 in Application No. 18150827.6.

* cited by examiner

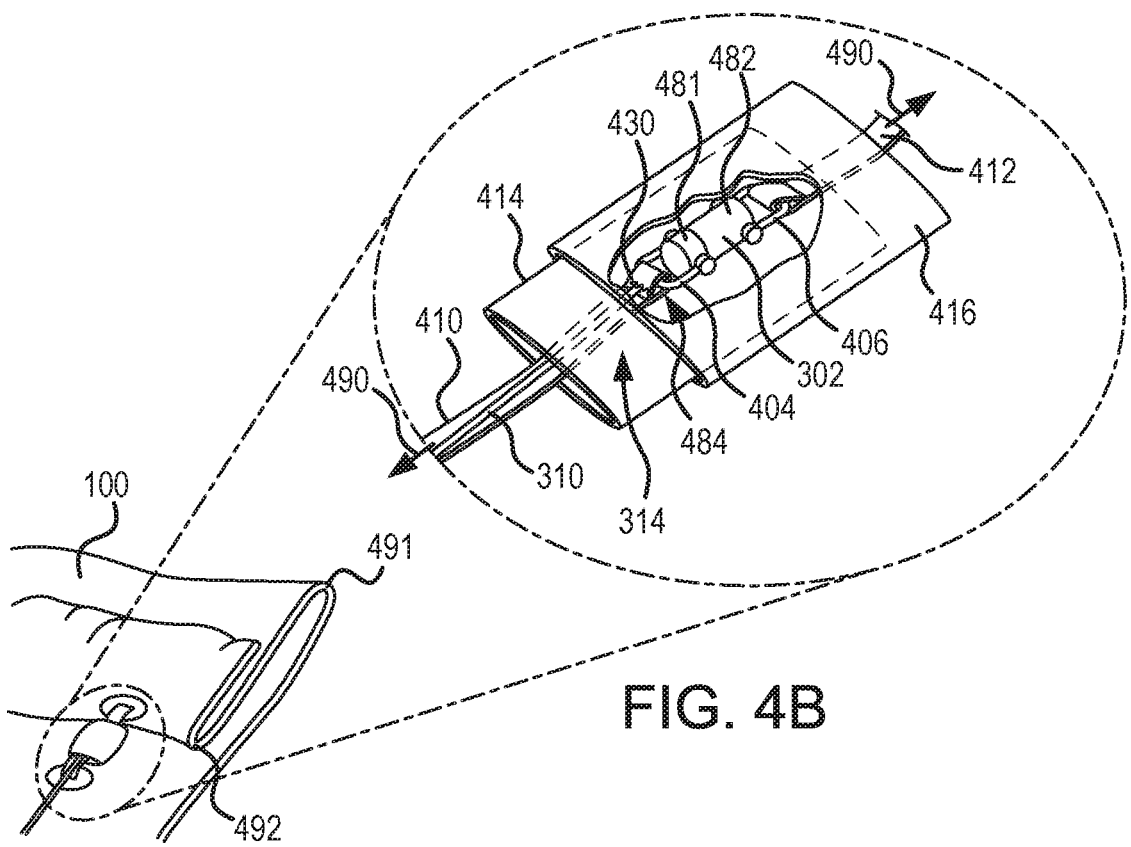
FIG. 4A
FIG. 4B
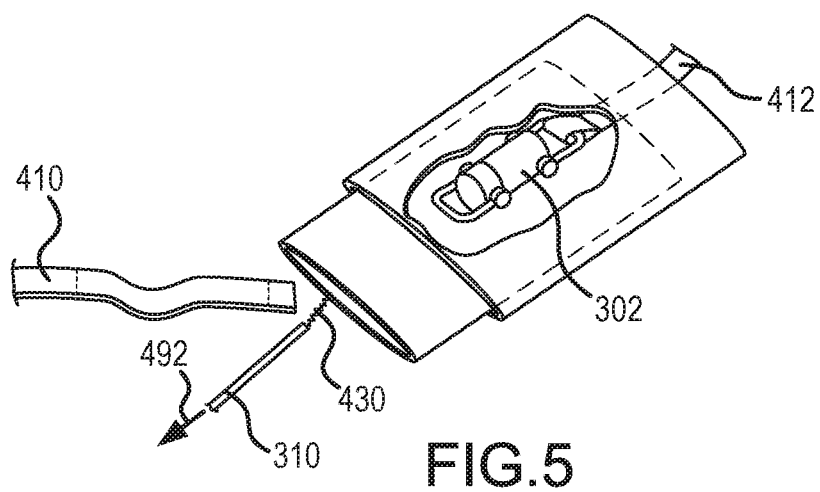
FIG. 5

SECONDARY RELEASE ARRANGEMENT FOR EVACUATION SLIDE SYSTEMS

FIELD

The present disclosure relates to inflatable evacuation slides and, in particular, to restraint release systems and methods for evacuation slides.

BACKGROUND

Emergency evacuation slides may be used to exit an aircraft absent a jet way or other suitable means of egress for passengers. The slides may deploy from a door sill or a side of the aircraft fuselage, for example. The slide deployment is controlled by restraints placed throughout the length of the slide which release in stages in response to internal slide pressure.

SUMMARY

In various embodiments, a secondary release arrangement for a releasable restraint is disclosed. A secondary release arrangement for a releasable restraint may comprise a flexible member in operable communication with a strap attached to the releasable restraint configured to release the strap from the releasable restraint in response to a tensile force in the flexible member exceeding a selected threshold.

In various embodiments, the secondary release arrangement may be configured to allow deployment of an evacuation system in the event of the releasable restraint failing to release. The secondary release arrangement may be configured to be operated manually while the releasable restraint is configured to operate automatically. The flexible member may be in operable communication with a plurality of straps attached to a plurality of releasable restraints. The flexible member may comprise a cable having a first end and a second end. The secondary release arrangement may further comprise a handle coupled to the first end. The secondary release arrangement may further comprise a thread coupled between the second end and the strap, wherein the thread is at least partially released from the strap, in response to the tensile force in the flexible member. The releasable restraint may be configured to release in response to an internal pressure of the evacuation system. The cable may comprise a sheath.

An evacuation system is disclosed herein, in accordance with various embodiments. An evacuation system may include an evacuation slide configured to be deployed from an aircraft, comprising a head end and a toe end, a releasable restraint having a first end coupled to the evacuation slide via a first strap and having a second end coupled to the evacuation slide via a second strap, and a secondary release arrangement comprising a flexible member in operable communication with the first strap attached to the releasable restraint configured to release the first strap from the releasable restraint in response to a tensile force in the flexible member exceeding a selected threshold.

In various embodiments, the secondary release arrangement may further comprise a thread, wherein the flexible member is coupled to the first strap via the thread. The flexible member may comprise a cable. The secondary release arrangement may further comprise a handle coupled to the flexible member, wherein the thread is at least partially released from the first strap, in response to the tensile force being applied via the handle. The releasable restraint may be configured to release in response to an internal pressure of the evacuation slide. The releasable restraint may comprise a shear pin restraint. The thread may comprise at least one of a cotton material, a nylon material, and a silk material. The handle may be coupled to the head end. The cable may comprise a sheath.

In various embodiments, a method for manufacturing an evacuation slide is disclosed. A method for manufacturing an evacuation slide may comprise disposing a first strap to extend between a restraint and the evacuation slide, coupling the first strap to the restraint via a thread, disposing a flexible member between a head end of the evacuation slide and the thread, and coupling the flexible member to the thread.

In various embodiments, the method may further comprise coupling a handle to the flexible member.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIGS. 4A and 4B illustrate a restraint aiding in retaining the evacuation slide in a folded position, in accordance with various embodiments;

FIG. 5 illustrates a first strap decoupled from the restraint in response to a flexible member pulling a thread, in accordance with various embodiments.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Slides according to the present disclosure may extend from an aircraft structure, such as a fuselage or a wing, for example, to an exit surface in a fully deployed position. During deployment, a plurality of restraints may aid in controlling the inflation process of the slide. The restraints may be configured to de-couple in response to internal slide pressure. A secondary release arrangement is provided to manually release the restraints in the event that the restraints do not de-couple automatically in response to the internal slide pressure.

Figure 1:
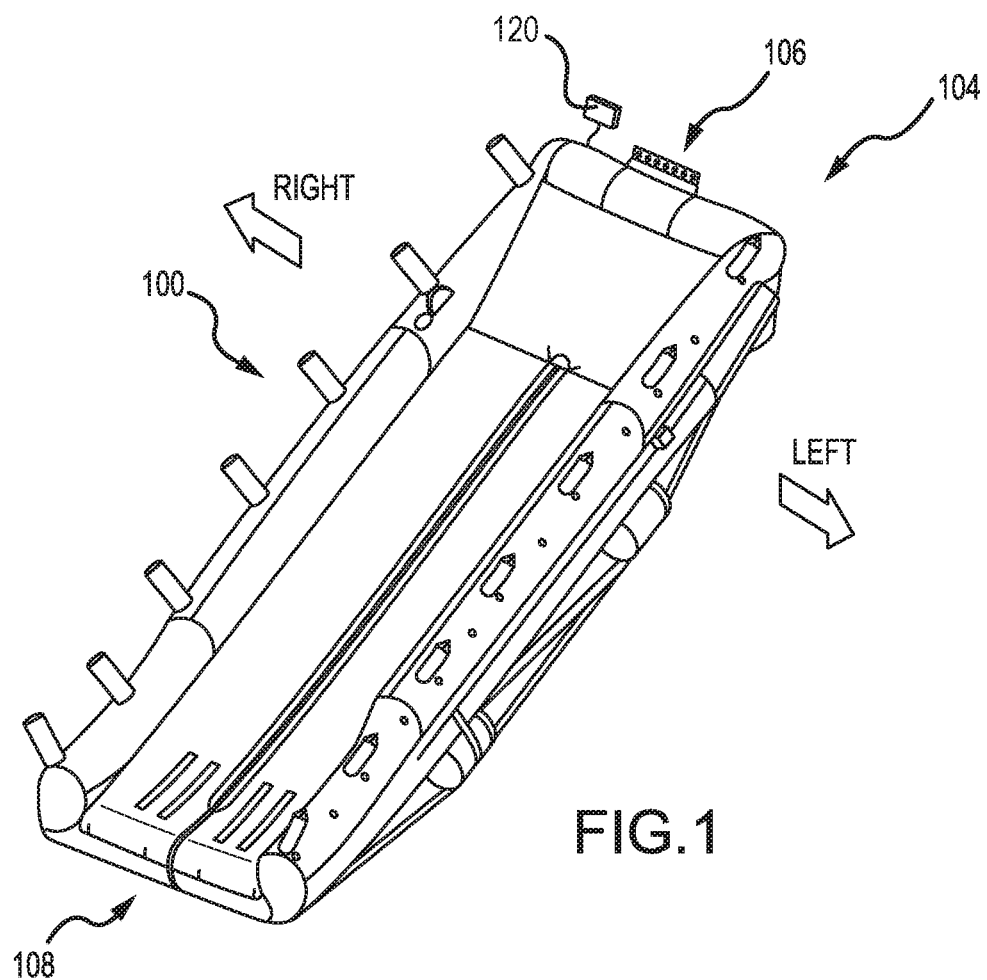
FIG. 1 illustrates a perspective view of an evacuation slide in a deployed position, in accordance with various embodiments.

With respect to FIG. 2 through FIG. 5, elements with like element numbering, as depicted in FIG. 1, are intended to be the same and will not necessarily be repeated for the sake of clarity. With respect to FIG. 5, elements with like element numbering, as depicted in FIG. 4, are intended to be the same and will not necessarily be repeated for the sake of clarity.

With reference to FIG. 1, an evacuation system 104 is illustrated, in accordance with various embodiments. Evacuation system 104 may comprise evacuation slide 100. Evacuation slide 100 may comprise a head end 106 and a toe end 108. Head end 106 may be coupled to aircraft structure. Evacuation slide 100 may comprise an inflatable slide. FIG. 1 illustrates evacuation slide 100 in an inflated and/or deployed position. Evacuation slide 100 may comprise a dual lane slide. However, evacuation slide 100 may comprise any number of lanes. Toe end 108 may contact an exit surface in response to evacuation slide 100 being deployed. In various embodiments, evacuation system 104 may include a handle 120 coupled to a secondary release arrangement, as is described with further detail herein. Handle 120 may be coupled to head end 106.

Figure 2:
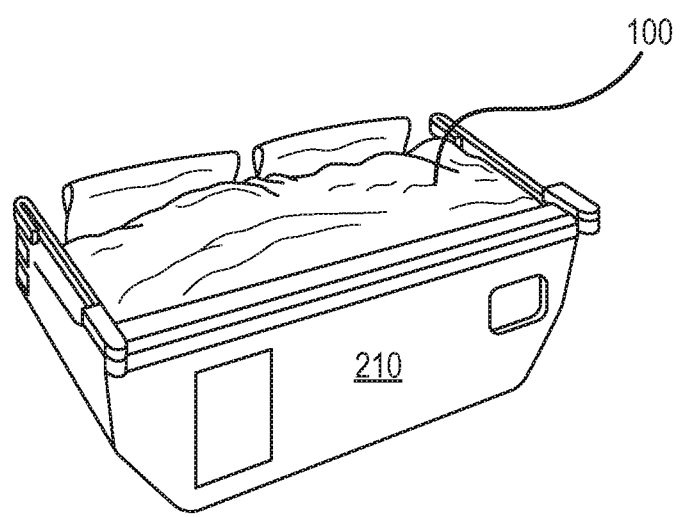
FIG. 2 illustrates a perspective view of an evacuation slide in a stowed position, in accordance with various embodiments.

With reference to FIG. 2, evacuation slide 100 is illustrated in a stowed and/or packed position. In this regard, evacuation slide 100 may be stowed in a packboard 210. In various embodiments, evacuation slide 100 may be folded in the stowed position. In various embodiments, evacuation slide 100 may be deployed from packboard 210 in response to opening an emergency exit door. Packboard 210 may be coupled to an aircraft in an installed position. Typically, a packboard 210 includes a blow-out panel which opens in response to deployment of evacuation slide 100 through which opening the inflatable may exit the packboard. In this regard, evacuation slide 100 may be configured to be deployed from an aircraft.

Figure 3:
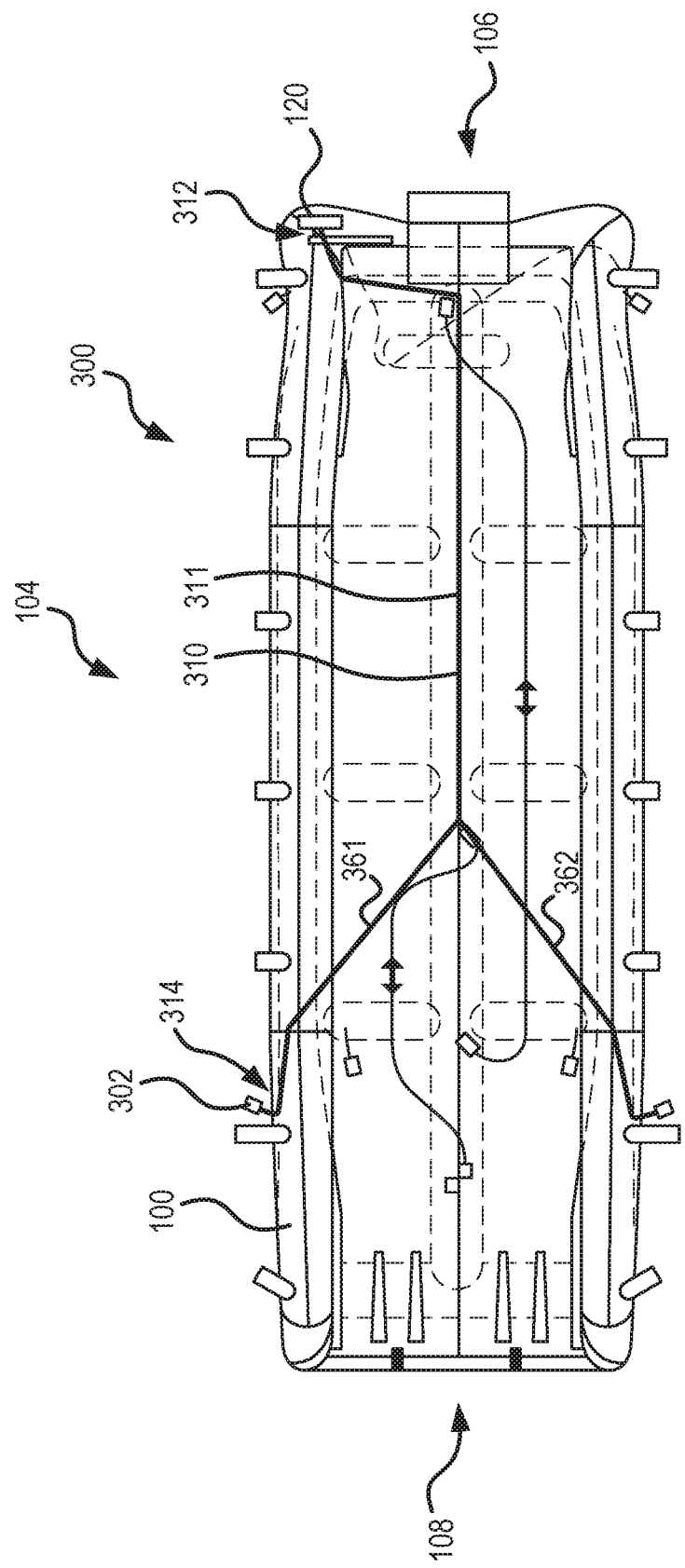
FIG. 3 illustrates a schematic view of a secondary release arrangement relative to an evacuation slide, in accordance with various embodiments.

With reference to FIG. 3, a schematic view of a secondary release arrangement 300 is illustrated, in accordance with various embodiments. Secondary release arrangement 300 may include flexible member 310. In various embodiments, flexible member 310 may comprise a cable. Flexible member 310 may comprise a metal material, a plastic material, and/or a fibrous material. In various embodiments, flexible member 310 may be woven or twisted. In various embodiments, flexible member 310 may comprise a steel cable or may comprise a plastic cable, such as a nylon cable for example. In various embodiments, flexible member 310 may comprise a steel cable having a sheath 311 surrounding flexible member 310. Sheath 311 may protect evacuation slide 100 from flexible member 310. Flexible member 310 may comprise a first end 312 and a second end 314.

In various embodiments, secondary release arrangement 300 may include handle 120. In various embodiments, handle 120 may be located at head end 106. In this regard, handle 120 may be coupled to head end 106. Handle 120 may comprise a pull handle. Handle 120 may be coupled to first end 312 of flexible member 310. In this regard, secondary release arrangement 300 may be configured to be operated manually, in accordance with various embodiments.

In various embodiments, second end 314 of flexible member 310 may be coupled to a releasable restraint 302 in a manner as described with regards to FIG. 4 and FIG. 5. In the illustrated embodiment of FIG. 3, flexible member 310 splits into a first branch 361 and a second branch 362. However, flexible member 310 may not split into different branches, or may split into any number of branches to be coupled to any number of restraints. In this regard, in response to a tensioning force being applied to handle 120, flexible member 310 may release a plurality of restraints. In this manner, a single handle may be provided to release various restraints of an evacuation slide to ensure that a failed restraint, regardless of location, is released. Stated differently, the secondary release arrangement 300 may be configured to allow deployment of an evacuation system in the event of the releasable restraint failing to release.

With reference to FIG. 4A and FIG. 4B, evacuation slide 100 is illustrated in a folded position, in accordance with various embodiments. For example, evacuation slide 100 may include a plurality of folds, including first fold 491 and second fold 492, when evacuation slide 100 is in the folded or stowed position. Restraint 302 may aid in maintaining first fold 491 and/or second fold 492. Restraint 302 may aid in staged deployment of evacuation slide 100. Evacuation slide 100 may unfold in response to restraint 302 separating.

In various embodiments, flexible member 310 may be in operable communication with a strap (e.g., first strap 410 and/or second strap 412) attached to the releasable restraint configured to release the strap from the releasable restraint 302 in response to a tensile force (e.g., force 490) in the flexible member 310 exceeding a selected threshold In various embodiments, restraint 302 may be configured to separate in response to an internal pressure in evacuation slide 100. For example, a gas cylinder may supply a flow of pressurized fluid to evacuation slide 100 in response to evacuation slide 100 being deployed. Evacuation slide 100 may begin to inflate and an internal pressure of evacuation slide 100 may increase. Restraint 302 may maintain evacuation slide 100 in a folded position until the internal pressure has increased above a predetermined threshold value. Evacuation slide 100 may unfold in response to restraint 302 separating. In this regard, evacuation slide 100 may fully deploy in response to restraint 302 separating. In this regard, restraint 302 is configured to operate automatically.

In various embodiments, restraint 302 may include a first shackle 404 and a second shackled 406. Restraint 302, first shackle 404, and/or second shackled 406 may be metallic. In various embodiments, restraint 302 may comprise a shear pin restraint. In this regard, a first portion 481 may decouple from a second portion 482 in response to a predetermined tensioning force illustrated by arrows 490. A first cover 414 may surround restraint 302. A second cover 416 may surround restraint 302. Second cover 416 may surround at least a portion of first cover 414. First cover 414 and second cover 416 may comprise a fabric.

A first strap 410 may be coupled between evacuation slide 100 and restraint 302. First strap 410 may be coupled to restraint 302 via first shackle 404. A second strap 412 may be coupled between evacuation slide 100 and restraint 302. First strap 410 may be looped around first shackle 404 and sewn to itself via a thread 430. Thread 430 may comprise, for example, a cotton material, a nylon material, a silk material, or any other suitable material. Thread 430 may retain first strap 410 in a loop. Furthermore, thread 430 may prevent first strap 410 from decoupling from first shackle 404. Thread 430 may be stitched in a manner such that a tensioning force, illustrated by arrow 492, imparted by flexible member 310 onto thread 430 may undo and/or break the stitching of thread 430. Stated differently, the closed loop 484 in first strap 410 may open in response to the tensioning force 492, by flexible member 310, onto thread 430. In this regard, first strap 410 may be decoupled from first shackle 404 in response to flexible member 310 pulling thread 430.

With combined reference to FIG. 2 and FIG. 5, FIG. 5 illustrates first strap 410 decoupled from restraint 302 with flexible member 310 having pulled thread 430 away from first strap 410. In this regard, flexible member 310 and first strap 410 may be decoupled or released from restraint 302 in response to handle 120 being pulled, which may allow evacuation slide 100 to fully deploy. Thread 430 may be at least partially released from first strap 410 in response to the tensioning force 492 being applied via handle 120. In this regard, although illustrated as thread 430 being attached to flexible member 430, it is contemplated herein that some or all of thread 430 may break away from flexible member 310 during decoupling of first strap 410 from restraint 302.

In various embodiments, first strap 410 and/or second strap 412 may comprise a rope, tape, ribbon, webbing, or any other suitable strap. In various embodiments, first strap 410 and/or second strap 412 may comprise nylon, ballistic nylon, polypropylene, polyester, cotton, or any other suitable material.

Figure 6:
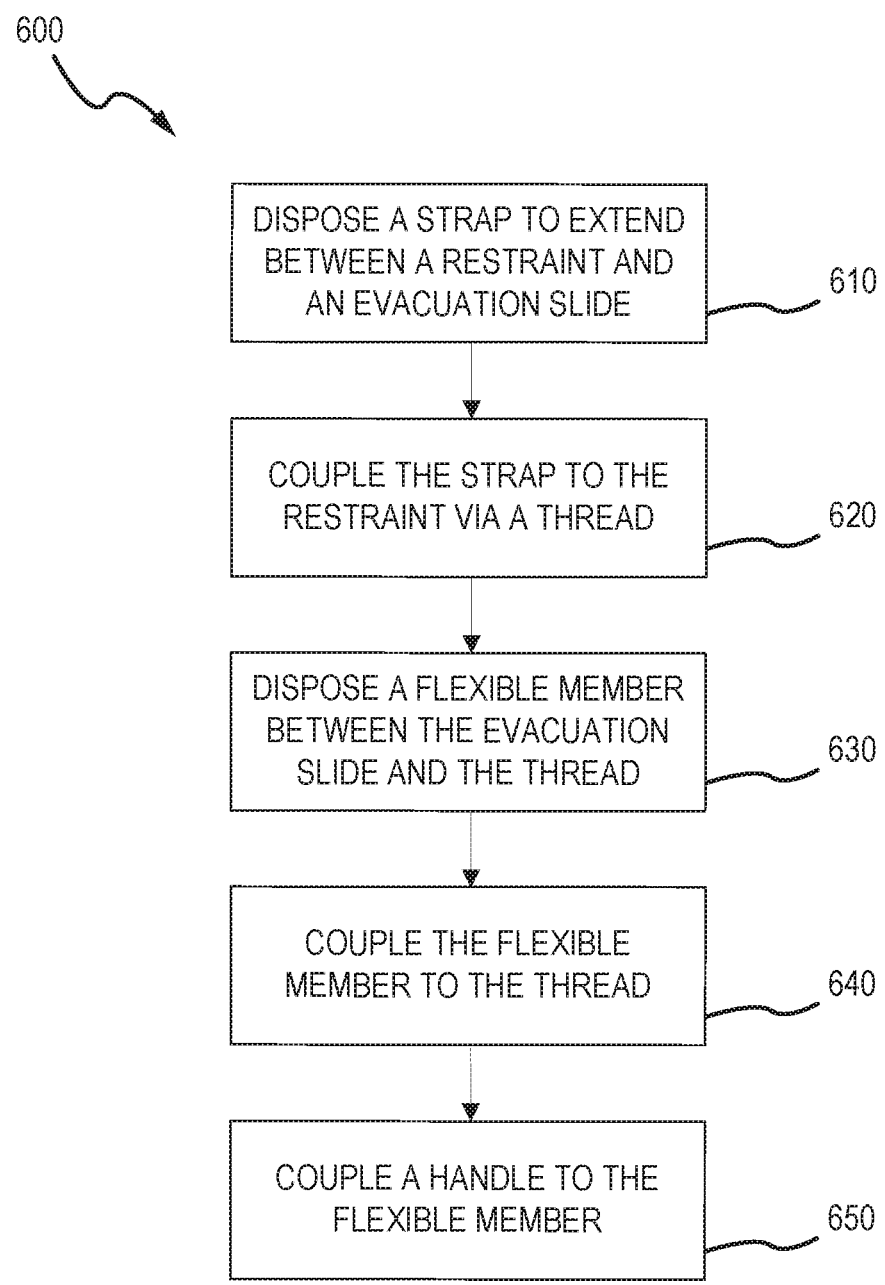
FIG. 6 illustrates a method for manufacturing an evacuation slide, in accordance with various embodiments.

With reference to FIG. 6, a method 600 for manufacturing an evacuation slide is provided, in accordance with various embodiments. Method 600 includes disposing a strap to extend between a restraint and an evacuation slide (step 610). Method 600 includes coupling the strap to the restraint via a thread (step 620). Method 600 includes disposing a flexible member between the evacuation slide and the thread (step 630). Method 600 includes coupling the flexible member to the thread (step 640). Method 600 may include coupling a handle to the flexible member (step 650).

In various embodiments, with combined reference to FIG. 2, FIG. 4A, FIG. 4B, and FIG. 6, step 610 may include disposing first strap 410 to extend between restraint 302 and evacuation slide 100. Step 620 may include coupling first strap 410 to restraint 302 via thread 430. Step 630 may include disposing flexible member 310 between head end 106 and thread 430. Step 640 may include coupling flexible member 310 to thread 430. Step 650 may include coupling handle 120 to the flexible member 310.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A secondary release arrangement for an inflatable evacuation system comprising:
   a releasable restraint;
   a strap coupled to the releasable restraint via a thread;
   a flexible member coupled to the thread, the flexible member is configured to break the thread to release the strap from the releasable restraint in response to a tensile force in the flexible member exceeding a selected threshold.

2. The secondary release arrangement of claim 1, wherein the secondary release arrangement is configured to allow deployment of an evacuation system in the event of the releasable restraint failing to release.

3. The secondary release arrangement of claim 1, wherein the secondary release arrangement is configured to be operated manually while the releasable restraint is configured to operate automatically.

4. The secondary release arrangement of claim 1, wherein the flexible member is in operable communication with a plurality of straps attached to a plurality of releasable restraints.

5. The secondary release arrangement of claim 2, wherein the flexible member comprises a cable having a first end and a second end.

6. The secondary release arrangement of claim 5, further comprising a handle coupled to the first end.

7. The secondary release arrangement of claim 6, wherein the thread is coupled between the second end and the strap, wherein the thread is at least partially released from the strap, in response to the tensile force in the flexible member.

8. The secondary release arrangement of claim 7, wherein the releasable restraint is configured to release in response to an internal pressure of the evacuation system.

9. The secondary release arrangement of claim 5, wherein the cable comprises a sheath.

10. An evacuation system, comprising:
   an evacuation slide configured to be deployed from an aircraft, comprising a head end and a toe end;
   a releasable restraint having a first end coupled to the evacuation slide via a first strap and having a second end coupled to the evacuation slide via a second strap, wherein the first strap is coupled to the first end of the releasable restraint via a thread; and
   a secondary release arrangement comprising:
      a flexible member coupled to the thread, the flexible member is configured to break the thread to release the strap from the releasable restraint in response to a tensile force in the flexible member exceeding a selected threshold.

11. The evacuation system of claim 10, wherein the flexible member is coupled to the first strap via the thread.

12. The evacuation system of claim 11, wherein the flexible member comprises a cable.

13. The evacuation system of claim 12, wherein the secondary release arrangement further comprises:
   a handle coupled to the flexible member, wherein the thread is at least partially released from the first strap, in response to the tensile force being applied via the handle.

14. The evacuation system of claim 13, wherein the releasable restraint is configured to release in response to an internal pressure of the evacuation slide.

15. The evacuation system of claim 14, wherein the releasable restraint comprises a shear pin restraint.

16. The evacuation system of claim 15, wherein the thread comprises at least one of a cotton material, a nylon material, and a silk material.

17. The evacuation system of claim 16, wherein the handle is coupled to the head end.

18. The evacuation system of claim 12, wherein the cable comprises a sheath.

19. A method for manufacturing an evacuation slide, comprising:
   disposing a first strap to extend between a releasable restraint and the evacuation slide;
   coupling the first strap to the releasable restraint via a thread;
   disposing a flexible member between a head end of the evacuation slide and the thread; and
   coupling the flexible member to the thread, wherein the flexible member is configured to break the thread to release the first strap from the releasable restraint in response to a tensile force in the flexible member exceeding a selected threshold.

20. The method according to claim 19, further comprising coupling a handle to the flexible member.

\* \* \* \* \*